United States Patent
Rhoads

(10) Patent No.: US 7,715,446 B2
(45) Date of Patent: May 11, 2010

(54) WIRELESS METHODS AND DEVICES EMPLOYING PLURAL-BIT DATA DERIVED FROM AUDIO INFORMATION

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 105 days.

(21) Appl. No.: 11/670,841

(22) Filed: Feb. 2, 2007

(65) Prior Publication Data
US 2007/0189533 A1   Aug. 16, 2007

Related U.S. Application Data

(63) Continuation-in-part of application No. 09/924,281, filed on Aug. 7, 2001, now Pat. No. 7,362,781, which is a continuation of application No. 09/339,314, filed on Jun. 23, 1999, now Pat. No. 6,278,781, which is a continuation of application No. 09/172,324, filed on Oct. 13, 1998, now Pat. No. 6,064,737, which is a continuation of application No. 08/637,531, filed on Apr. 25, 1996, now Pat. No. 5,822,436.

(51) Int. Cl.
*H04J 3/06* (2006.01)
(52) U.S. Cl. .................... 370/522; 380/247
(58) Field of Classification Search .............. None
See application file for complete search history.

(56) References Cited

U.S. PATENT DOCUMENTS

| | | |
|---|---|---|
| 3,004,104 A | 10/1961 | Hembroke |
| 3,406,344 A | 10/1968 | Hopper |
| 3,517,315 A | 6/1970 | Malm |
| 3,586,781 A | 6/1971 | Jones |
| 3,898,390 A * | 8/1975 | Wells et al. ............ 455/438 |
| 3,984,624 A | 10/1976 | Waggener |
| 4,225,967 A | 9/1980 | Miwa |
| 4,237,484 A | 12/1980 | Brown et al. |
| 4,238,849 A | 12/1980 | Gassmann |
| 4,295,223 A * | 10/1981 | Shutterly .............. 455/72 |
| 4,313,197 A | 1/1982 | Maxemchuk |
| 4,367,488 A | 1/1983 | Leventer |
| 4,379,947 A | 4/1983 | Warner |

(Continued)

FOREIGN PATENT DOCUMENTS

WO   WO9514289   5/1995

OTHER PUBLICATIONS

Bender, "Techniques for Data Hiding," SPIE vol. 2420, pp. 164-173, Jan. 1995.

(Continued)

*Primary Examiner*—Phirin Sam

(57) ABSTRACT

Wireless devices and methods employ steganography for a variety of purposes. An exemplary application is a battery-powered cell phone, having, e.g., a microphone, a speaker, a modulator, an antenna, and an RF amplifier. In such application, steganographic techniques can be employed to encode, or decode, signals processed by the phone. Some embodiments use an image sensor to capture watermarked image data. The phone can respond to detection of such marked imagery by overlaying distinctive graphics on a cell phone display screen. Such graphics may be positioned within the display, and affine-warped, in registered relationship with the position of the watermarked object, and its affine distortion, as depicted in the image data.

21 Claims, 4 Drawing Sheets

U.S. PATENT DOCUMENTS

| | | | |
|---|---|---|---|
| 4,380,027 A | 4/1983 | Leventer |
| 4,395,600 A | 7/1983 | Lundy |
| 4,425,642 A | 1/1984 | Moses |
| 4,425,661 A | 1/1984 | Moses et al. |
| 4,528,588 A | 7/1985 | Lofberg |
| 4,547,804 A | 10/1985 | Greenberg |
| 4,672,605 A | 6/1987 | Hustig |
| 4,675,746 A | 6/1987 | Tetrick et al. |
| 4,703,476 A | 10/1987 | Howard |
| 4,750,173 A | 6/1988 | Bluthgen |
| 4,807,031 A | 2/1989 | Broughton |
| 4,855,827 A | 8/1989 | Best |
| 4,876,617 A | 10/1989 | Best et al. |
| 4,908,836 A | 3/1990 | Rushforth |
| 4,931,871 A | 6/1990 | Kramer |
| 4,943,973 A | 7/1990 | Werner |
| 4,969,041 A | 11/1990 | O'Grady |
| 4,972,471 A | 11/1990 | Gross et al. |
| 4,979,210 A | 12/1990 | Nagata et al. |
| 5,010,405 A | 4/1991 | Schreiber et al. |
| 5,025,443 A | 6/1991 | Gupta |
| 5,084,891 A | 1/1992 | Ariyavisitakul |
| 5,103,459 A | 4/1992 | Gilhousen |
| 5,113,437 A | 5/1992 | Best et al. |
| 5,134,719 A | 7/1992 | Mankovitz |
| 5,144,649 A | 9/1992 | Zicker et al. |
| 5,146,457 A | 9/1992 | Veldhuis et al. |
| 5,153,919 A | 10/1992 | Reeds, III et al. |
| 5,161,210 A | 11/1992 | Druyvesteyn et al. |
| 5,185,762 A | 2/1993 | Schilling |
| 5,200,822 A | 4/1993 | Bronfin et al. |
| 5,204,902 A | 4/1993 | Reeds |
| 5,243,423 A | 9/1993 | DeJean |
| 5,319,735 A | 6/1994 | Preuss et al. |
| 5,327,237 A | 7/1994 | Gerdes et al. |
| 5,335,278 A | 8/1994 | Matchett et al. |
| 5,345,595 A | 9/1994 | Johnson et al. |
| 5,355,161 A | 10/1994 | Bird |
| 5,379,345 A | 1/1995 | Greenberg |
| 5,387,941 A | 2/1995 | Montgomery et al. |
| 5,388,212 A | 2/1995 | Grube et al. |
| 5,392,356 A * | 2/1995 | Konno et al. | 380/249 |
| 5,404,377 A | 4/1995 | Moses |
| 5,410,541 A | 4/1995 | Hotto |
| 5,420,910 A | 5/1995 | Rudokas et al. |
| 5,430,760 A | 7/1995 | Dent |
| 5,448,760 A | 9/1995 | Frederick |
| 5,450,490 A | 9/1995 | Jensen et al. |
| 5,454,027 A | 9/1995 | Kennedy et al. |
| 5,465,387 A | 11/1995 | Mukherjee |
| 5,467,169 A | 11/1995 | Morikawa |
| 5,473,631 A | 12/1995 | Moses |
| 5,485,518 A | 1/1996 | Hunter et al. |
| 5,559,559 A | 9/1996 | Jungo et al. |
| 5,574,962 A | 11/1996 | Fardeau |
| 5,577,044 A * | 11/1996 | Oxford | 370/522 |
| 5,577,266 A | 11/1996 | Takahisa et al. |
| 5,579,124 A | 11/1996 | Aijala et al. |
| 5,584,070 A | 12/1996 | Harris |
| 5,608,723 A * | 3/1997 | Felsenstein | 370/335 |
| 5,612,974 A | 3/1997 | Astrachan |
| 5,613,004 A * | 3/1997 | Cooperman et al. | 380/28 |
| 5,621,800 A * | 4/1997 | Weng et al. | 380/266 |
| 5,646,997 A | 7/1997 | Barton |
| 5,652,626 A | 7/1997 | Kawakami et al. |
| 5,659,726 A | 8/1997 | Sandford, II et al. |
| 5,663,766 A | 9/1997 | Sizer |
| 5,687,191 A | 11/1997 | Lee |
| 5,687,236 A | 11/1997 | Moskowitz et al. |
| 5,712,920 A | 1/1998 | Spille |
| 5,719,937 A | 2/1998 | Warren |
| 5,721,788 A | 2/1998 | Powell |
| 5,745,569 A | 4/1998 | Moskowitz et al. |
| 5,761,606 A | 6/1998 | Wolzien |
| 5,764,763 A | 6/1998 | Jensen |
| 5,764,770 A | 6/1998 | Schipper |
| 5,774,452 A | 6/1998 | Wolosewicz |
| 5,799,082 A | 8/1998 | Murphy et al. |
| 5,822,360 A | 10/1998 | Lee et al. |
| 5,822,432 A | 10/1998 | Moskowitz et al. |
| 5,826,227 A | 10/1998 | Jayant |
| 5,850,481 A * | 12/1998 | Rhoads | 382/232 |
| 5,872,531 A | 2/1999 | Johnson |
| 5,905,800 A | 5/1999 | Moskowitz et al. |
| 5,932,863 A | 8/1999 | Rathus |
| 5,937,000 A | 8/1999 | Lee |
| 5,978,773 A | 11/1999 | Hudetz |
| 5,991,737 A | 11/1999 | Chen |
| 5,999,569 A * | 12/1999 | Oshima | 375/265 |
| 6,064,737 A | 5/2000 | Rhoads |
| 6,154,484 A | 11/2000 | Lee |
| 6,181,802 B1 | 1/2001 | Todd |
| 6,278,781 B1 | 8/2001 | Rhoads |
| 6,282,362 B1 | 8/2001 | Murphy et al. |
| 6,289,108 B1 | 9/2001 | Rhoads |
| 6,512,837 B1 | 1/2003 | Ahmed |
| 6,560,350 B2 | 5/2003 | Rhoads |
| 6,687,345 B1 | 2/2004 | Swartz |
| 6,771,797 B2 | 8/2004 | Ahmed |
| 7,035,427 B2 * | 4/2006 | Rhoads | 382/100 |
| 7,536,555 B2 * | 5/2009 | Rhoads | 713/176 |
| 2007/0160124 A1 * | 7/2007 | Dorr | 375/222 |

OTHER PUBLICATIONS

Cox et al, "Secure Spread Spectrum Watermarking for Multimedia," NEC Technical Report, Dec. 1995.

ten Kate, Digital audio carrying extra information, ICASSP-90, pp. 1097-1100, Apr. 3, 1990.

Luc, Analysis of Speed Spectrum System Parameters for Design of Hidden Transmission, Radioengineering, vol. 4, No. 2, pp. 26-29, Jun. 1995.

Macq, Cryptology for Digital TV Broadcasting, Proc. Of the IEEE, Vo. 83, No. 6, pp. 944-957, Jun. 1995.

Frequently Asked Questions About Digimarc Signature Technology, Digimarc Corp., Aug. 1995.

\* cited by examiner

MEAN-REMOVED HISTOGRAMS OF
DIFFERENCE SIGNAL AND KNOWN EMBEDDED
CODE SIGNAL

MEAN-REMOVED HISTOGRAMS OF
FIRST DERIVATIVES (OR SCALER GRADIENTS
IN THE CASE OF AN IMAGE)

WIRELESS METHODS AND DEVICES EMPLOYING PLURAL-BIT DATA DERIVED FROM AUDIO INFORMATION

RELATED APPLICATION DATA

This application is a continuation-in-part of application Ser. No. 09/924,281, filed Aug. 7, 2001, (now U.S. Pat. No. 7,362,781), which is a continuation of application Ser. No. 09/339,314, filed Jun. 23, 1999 (now U.S. Pat. No. 6,278, 781), which is a continuation of application Ser. No. 09/172, 324, filed Oct. 13, 1998, (now U.S. Pat. No. 6,064,737) which is a continuation of application Ser. No. 08/637,531, filed Apr. 25, 1996 (now U.S. Pat. No. 5,822,436).

The subject matter of the present application is also related to that disclosed in applications Ser. No. 08/534,005, filed Sep. 25, 1995 (now U.S. Pat. No. 5,832,119); Ser. No. 08/512, 993, filed Aug. 9, 1995 (abandoned in favor of FWC application Ser. No. 08/763,847, now U.S. Pat. No. 5,841,886); Ser. No. 08/508,083, filed Jul. 27, 1995 (now U.S. Pat. No. 5,841, 978); Ser. No. 08/436,098 (now U.S. Pat. No. 5,636,292), Ser. No. 08/436,099 (now U.S. Pat. No. 5,710,834), Ser. No. 08/436,102 (now U.S. Pat. No. 5,748,783), Ser. No. 08/436, 134 (now U.S. Pat. No. 5,748,763), and Ser. No. 08/438,159 (now U.S. Pat. No. 5,850,481), each filed May 8, 1995; Ser. No. 08/327,426, filed Oct. 21, 1994 (now U.S. Pat. No. 5,768, 426); Ser. No. 08/215,289, filed Mar. 17, 1994 (now abandoned in favor of FWC application Ser. No. 08/614,521, filed Mar. 15, 1996, now U.S. Pat. No. 5,745,604); and Ser. No. 08/154,866, filed Nov. 18, 1993 (now abandoned), which applications and patents are incorporated herein by reference.

TECHNICAL FIELD

The present technology relates to wireless communication systems, such as cellular systems and PCS systems.

BACKGROUND AND PARTIAL SUMMARY (For expository convenience, this disclosure generally refers to cellular telephony systems. However, it should be recognized that the detailed technology is not so limited, but can be used with any wireless communications device, whether for voice or data; analog or digital.)

In the cellular telephone industry, hundreds of millions of dollars of revenue is lost each year through theft of services. While some services are lost due to physical theft of cellular telephones, the more pernicious threat is posed by cellular telephone hackers.

Cellular telephone hackers employ various electronic devices to mimic the identification signals produced by an authorized cellular telephone. (These signals are sometimes called authorization signals, verification numbers, signature data, etc.) Often, the hacker learns of these signals by eavesdropping on authorized cellular telephone subscribers and recording the data exchanged with the cell cite. By artful use of this data, the hacker can impersonate an authorized subscriber and dupe the carrier into completing pirate calls.

In the prior art, identification signals are segregated from the voice signals. Most commonly, they are temporally separated, e.g. transmitted in a burst at the time of call origination. Voice data passes through the channel only after a verification operation has taken place on this identification data. (Identification data is also commonly included in data packets sent during the transmission.) Another approach is to spectrally separate the identification, e.g. in a spectral subband outside that allocated to the voice data.

Other fraud-deterrent schemes have also been employed. One class of techniques monitors characteristics of a cellular telephone's RF signal to identify the originating phone. Another class of techniques uses handshaking protocols, wherein some of the data returned by the cellular telephone is based on an algorithm (e.g. hashing) applied to random data sent thereto.

Combinations of the foregoing approaches are also sometimes employed.

U.S. Pat. Nos. 5,465,387, 5,454,027, 5,420,910, 5,448, 760, 5,335,278, 5,345,595, 5,144,649, 5,204,902, 5,153,919 and 5,388,212 detail various cellular telephone systems, and fraud deterrence techniques used therein. The disclosures of these patents are incorporated by reference.

As the sophistication of fraud deterrence systems increases, so does the sophistication of cellular telephone hackers. Ultimately, hackers have the upper hand since they recognize that all prior art systems are vulnerable to the same weakness: the identification is based on some attribute of the cellular telephone transmission outside the voice data. Since this attribute is segregated from the voice data, such systems will always be susceptible to pirates who electronically "patch" their voice into a composite electronic signal having the attribute(s) necessary to defeat the fraud deterrence system.

To overcome this failing, certain detailed arrangements steganographically encodes the voice signal with identification data, resulting in "in-band" signaling (in-band both temporally and spectrally). This approach allows the carrier to monitor the user's voice signal and decode the identification data therefrom.

In one arrangement, some or all of the identification data used in the prior art (e.g. data transmitted at call origination) is repeatedly steganographically encoded in the user's voice signal as well. The carrier can thus periodically or aperiodically check the identification data accompanying the voice data with that sent at call origination to ensure they match. If they do not, the call is identified as being hacked and steps for remediation can be instigated such as interrupting the call.

In another arrangement, a randomly selected one of several possible messages is repeatedly steganographically encoded on the subscriber's voice. An index sent to the cellular carrier at call set-up identifies which message to expect. If the message steganographically decoded by the cellular carrier from the subscriber's voice does not match that expected, the call is identified as fraudulent.

In one particular arrangement, the steganographic encoding relies on a pseudo random data signal to transform the message or identification data into a low level noise-like signal superimposed on the subscriber's digitized voice signal. This pseudo random data signal is known, or knowable, to both the subscriber's telephone (for encoding) and to the cellular carrier (for decoding). Many such embodiments rely on a deterministic pseudo random number generator seeded with a datum known to both the telephone and the carrier. In simple embodiments this seed can remain constant from one call to the next (e.g. a telephone ID number). In more complex embodiments, a pseudo-one-time pad system may be used, wherein a new seed is used for each session (i.e. telephone call). In a hybrid system, the telephone and cellular carrier each have a reference noise key (e.g. 10,000 bits) from which the telephone selects a field of bits, such as 50 bits beginning at a randomly selected offset, and each uses this excerpt as the seed to generate the pseudo random data for encoding. Data sent from the telephone to the carrier (e.g. the offset) during call set-up allows the carrier to reconstruct the same pseudo random data for use in decoding. Yet further improvements can be derived by borrowing basic techniques from the art of cryptographic communications and applying them to the steganographically encoded signal detailed in this disclosure.

Details of applicant's preferred techniques for steganographic encoding/decoding with a pseudo random data stream are more particularly detailed in applicant's prior applications, but the present technology is not limited to use with such techniques. A brief review of other steganographic techniques suitable for use with the present technology follows.

British patent publication 2,196,167 to Thorn EMI discloses a system in which an audio recording is electronically mixed with a marking signal indicative of the owner of the recording, where the combination is perceptually identical to the original. U.S. Pat. Nos. 4,963,998 and 5,079,648 disclose variants of this system.

U.S. Pat. No. 5,319,735 to B.B.N. rests on the same principles as the earlier Thorn EMI publication, but additionally addresses psycho-acoustic masking issues.

U.S. Pat. Nos. 4,425,642, 4,425,661, 5,404,377 and 5,473,631 to Moses disclose various systems for imperceptibly embedding data into audio signals—the latter two patents particularly focusing on neural network implementations and perceptual coding details.

U.S. Pat. No. 4,943,973 to AT&T discloses a system employing spread spectrum techniques for adding a low level noise signal to other data to convey auxiliary data therewith. The patent is particularly illustrated in the context of transmitting network control signals along with digitized voice signals.

U.S. Pat. No. 5,161,210 to U.S. Philips discloses a system in which additional low-level quantization levels are defined on an audio signal to convey, e.g., a copy inhibit code, therewith.

U.S. Pat. No. 4,972,471 to Gross discloses a system intended to assist in the automated monitoring of audio (e.g. radio) signals for copyrighted materials by reference to identification signals subliminally embedded therein.

There are a variety of shareware programs available on the internet (e.g. "Stego" and "White Noise Storm") which generally operate by swapping bits from a to-be-concealed message stream into the least significant bits of an image or audio signal. White Noise Storm effects a randomization of the data to enhance its concealment.

A British company, Highwater FBI, Ltd., has introduced a software product which is said to imperceptibly embed identifying information into photographs and other graphical images. This technology is the subject of European patent applications 9400971.9 (filed Jan. 19, 1994), 9504221.2 (filed Mar. 2, 1995), and 9513790.7 (filed Jul. 3, 1995), the first of which has been laid open as PCT publication WO 95/20291.

Walter Bender at M.I.T. has done a variety of work in the field, as illustrated by his paper "Techniques for Data Hiding," Massachusetts Institute of Technology, Media Laboratory, January 1995.

Dice, Inc. of Palo Alto has developed an audio marking technology marketed under the name Argent. While a U.S. patent Application is understood to be pending, it has not yet been issued.

Tirkel et al, at Monash University, have published a variety of papers on "electronic watermarking" including, e.g., "Electronic Water Mark," DICTA-93, Macquarie University, Sydney, Australia, December, 1993, pp. 666-673, and "A Digital Watermark," IEEE International Conference on Image Processing, Nov. 13-16, 1994, pp. 86-90.

Cox et al, of the NEC Technical Research Institute, discuss various data embedding techniques in their published NEC technical report entitled "Secure Spread Spectrum Watermarking for Multimedia," December, 1995.

Möller et al. discuss an experimental system for imperceptibly embedding auxiliary data on an ISDN circuit in "Rechnergestutzte Steganographie: Wie sie Funktioniert und warum folglich jede Reglementierung von Verschlusselung unsinnig ist," DuD, Datenschutz und Datensicherung, 18/6 (1994) 318-326. The system randomly picks ISDN signal samples to modify, and suspends the auxiliary data transmission for signal samples which fall below a threshold.

In addition to the foregoing, many of the other cited prior art patents and publications disclose systems for embedding a data signal on an audio signal. These, too, can generally be employed in systems according to the present disclosure.

The foregoing and additional features and advantages will be more readily apparent from the following detailed description, which proceeds with reference to the accompanying drawings.

DETAILED DESCRIPTION

The reader is presumed to be familiar with cellular communications technologies. Accordingly, details known from prior art in this field aren't belabored herein.

Figure 1:
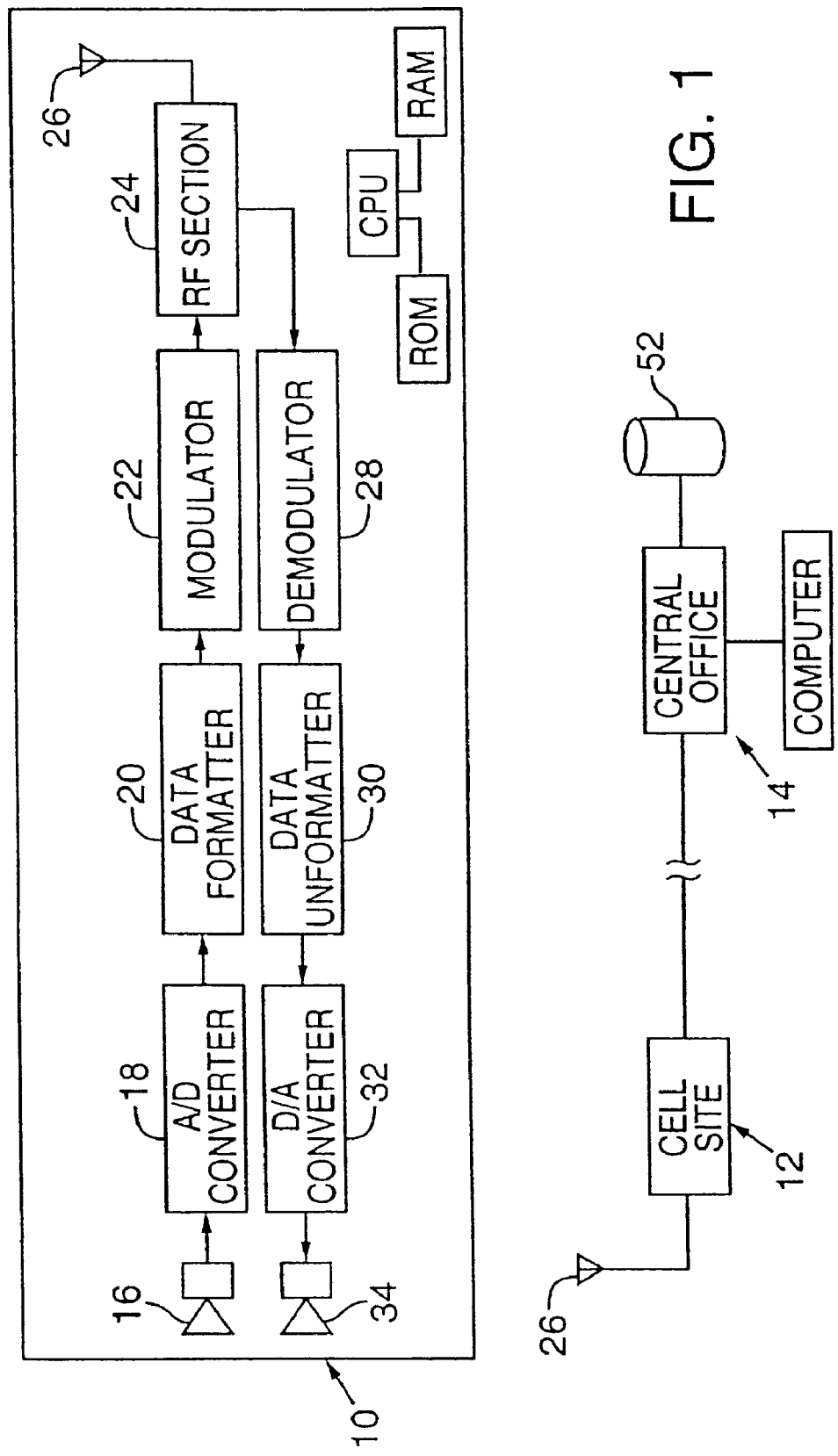
FIG. 1 is a block diagram showing principal components of an exemplary wireless telephony system.

Referring to FIG. 1, an illustrative cellular system includes a telephone 10, a cell site 12, and a central office 14.

Conceptually, the telephone may be viewed as including a microphone 16, an A/D converter 18, a data formatter 20, a modulator 22, an RF section 24, an antenna 26, a demodulator 28, a data unformatter 30, a D/A converter 32, and a speaker 34.

In operation, a subscriber's voice is picked up by the microphone 16 and converted to digital form by the A/D converter 18. The data formatter 20 puts the digitized voice into packet form, adding synchronization and control bits thereto. The modulator 22 converts this digital data stream into an analog signal whose phase and/or amplitude properties change in accordance with the data being modulated. The RF section 24 commonly translates this time-varying signal to one or more intermediate frequencies, and finally to a UHF transmission frequency. The RF section thereafter amplifies it and provides the resulting signal to the antenna 26 for broadcast to the cell site 12.

The process works in reverse when receiving. A broadcast from the cell cite is received through the antenna 26. RF section 24 amplifies and translates the received signal to a different frequency for demodulation. Demodulator 28 processes the amplitude and/or phase variations of the signal provided by the RF section to produce a digital data stream corresponding thereto. The data unformatter 30 segregates the voice data from the associated synchronization/control data, and passes the voice data to the D/A converter for conversion into analog form. The output from the D/A converter drives the speaker 34, through which the subscriber hears the other party's voice.

The cell site 12 receives broadcasts from a plurality of telephones 10, and relays the data received to the central office 14. Likewise, the cell site 12 receives outgoing data from the central office and broadcasts same to the telephones.

The central office 14 performs a variety of operations, including call authentication, switching, and cell hand-off.

(In some systems, the functional division between the cell site and the central station is different than that outlined above. Indeed, in some systems, all of this functionality is provided at a single site.)

In an exemplary arrangement, each telephone 10 additionally includes a steganographic encoder 36. Likewise, each cell site 12 includes a steganographic decoder 38. The encoder operates to hide an auxiliary data signal among the signals representing the subscriber's voice. The decoder performs the reciprocal function, discerning the auxiliary data signal from the encoded voice signal. The auxiliary signal serves to verify the legitimacy of the call.

Figure 2:
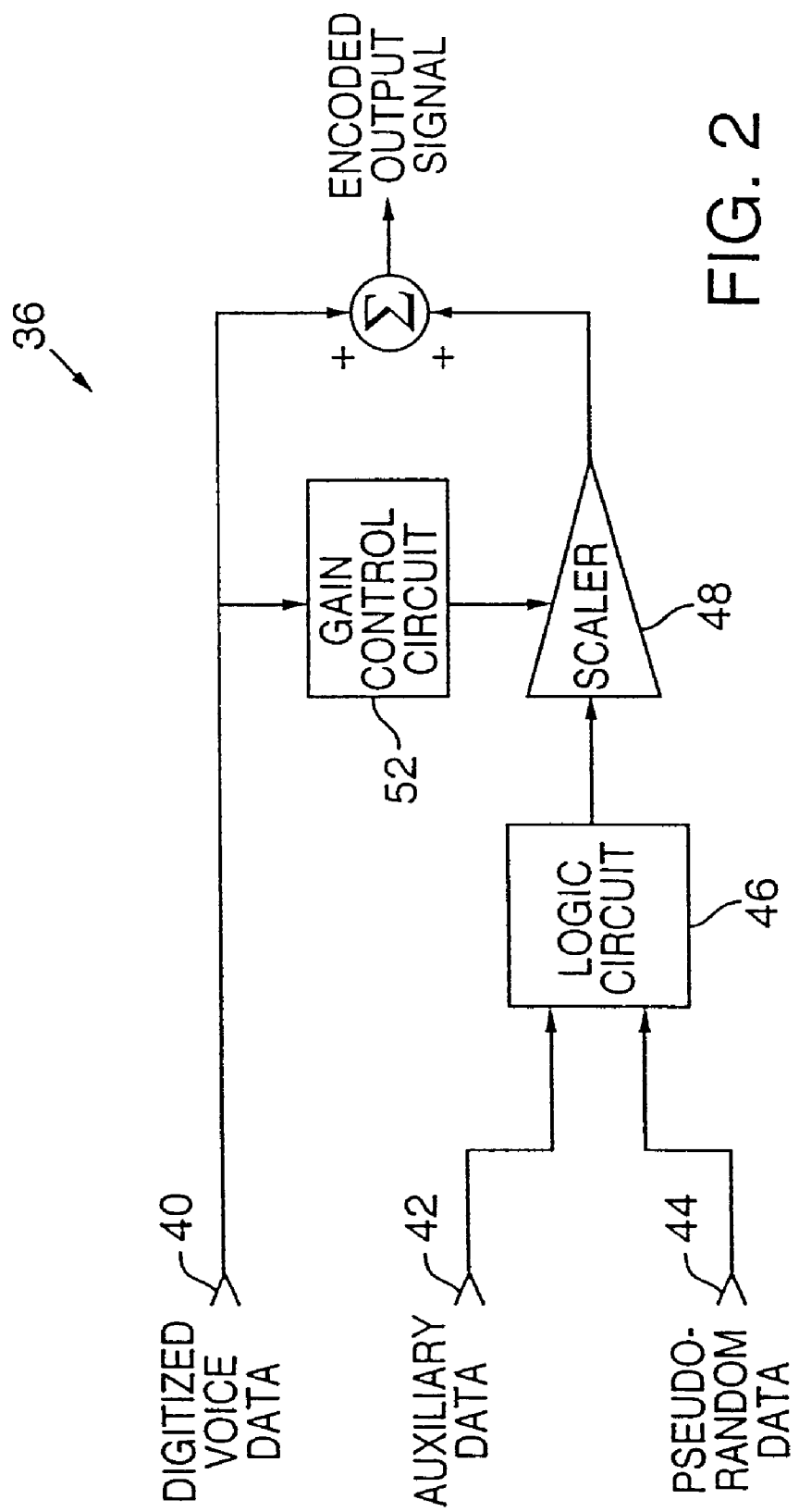
FIG. 2 is a block diagram of an exemplary steganographic encoder that can be used in the telephone of the FIG. 1 system.

An exemplary steganographic encoder 36 is shown in FIG. 2.

The illustrated encoder 36 operates on digitized voice data, auxiliary data, and pseudo-random noise (PRN) data. The digitized voice data is applied at a port 40 and is provided, e.g., from A/D converter 18. The digitized voice may comprise 8-bit samples. The auxiliary data is applied at a port 42 and comprises, in one embodiment, a stream of binary data uniquely identifying the telephone 10. (The auxiliary data may additionally include administrative data of the sort conventionally exchanged with a cell site at call set-up.) The pseudo-random noise data is applied at a port 44 and can be, e.g., a signal that randomly alternates between "−1" and "1" values. (More and more cellular phones are incorporating spread spectrum capable circuitry, and this pseudo-random noise signal and other aspects of this technology can often "piggy-back" or share the circuitry which is already being applied in the basic operation of a cellular unit).

For expository convenience, it is assumed that all three data signals applied to the encoder 36 are clocked at a common rate, although this is not necessary in practice.

In operation, the auxiliary data and PRN data streams are applied to the two inputs of a logic circuit 46. The output of circuit 46 switches between −1 and +1 in accordance with the following table:

| AUX | PRN | OUTPUT |
|---|---|---|
| 0 | −1 | 1 |
| 0 | 1 | −1 |
| 1 | −1 | −1 |
| 1 | 1 | 1 |

(If the auxiliary data signal is conceptualized as switching between −1 and 1, instead of 0 and 1, it will be seen that circuit 46 operates as a one-bit multiplier.)

The output from gate 46 is thus a bipolar data stream whose instantaneous value changes randomly in accordance with the corresponding values of the auxiliary data and the PRN data. It may be regarded as noise. However, it has the auxiliary data encoded therein. The auxiliary data can be extracted if the corresponding PRN data is known.

The noise-like signal from gate 46 is applied to the input of a scaler circuit 48. Scaler circuit scales (e.g. multiplies) this input signal by a factor set by a gain control circuit 50. In the illustrated embodiment, this factor can range between 0 and 15. The output from scaler circuit 48 can thus be represented as a five-bit data word (four bits, plus a sign bit) which changes each clock cycle, in accordance with the auxiliary and PRN data, and the scale factor. The output from the scaler circuit may be regarded as "scaled noise data" (but again it is "noise" from which the auxiliary data can be recovered, given the PRN data).

The scaled noise data is summed with the digitized voice data by a summer 51 to provide the encoded output signal (e.g. binarily added on a sample by sample basis). This output signal is a composite signal representing both the digitized voice data and the auxiliary data.

The gain control circuit 50 controls the magnitude of the added scaled noise data so its addition to the digitized voice data does not noticeably degrade the voice data when converted to analog form and heard by a subscriber. The gain control circuit can operate in a variety of ways.

One is a logarithmic scaling function. Thus, for example, voice data samples having decimal values of 0, 1 or 2 may correspond to scale factors of unity, or even zero, whereas voice data samples having values in excess of 200 may correspond to scale factors of 15. Generally speaking, the scale factors and the voice data values correspond by a square root relation. That is, a four-fold increase in a value of the voice data corresponds to approximately a two-fold increase in a value of the scaling factor associated therewith. Another scaling function would be linear as derived from the average power of the voice signal.

(The parenthetical reference to zero as a scaling factor alludes to cases, e.g., in which the digitized voice signal sample is essentially devoid of information content.)

More satisfactory than basing the instantaneous scaling factor on a single voice data sample, is to base the scaling factor on the dynamics of several samples. That is, a stream of digitized voice data which is changing rapidly can camouflage relatively more auxiliary data than a stream of digitized voice data which is changing slowly. Accordingly, the gain control circuit 50 can be made responsive to the first, or preferably the second- or higher-order derivative of the voice data in setting the scaling factor.

In still other embodiments, the gain control block 50 and scaler 48 can be omitted entirely.

(Those skilled in the art will recognize the potential for "rail errors" in the foregoing systems. For example, if the digitized voice data consists of 8-bit samples, and the samples span the entire range from 0 to 255 (decimal), then the addition or subtraction of scaled noise to/from the input signal may produce output signals that cannot be represented by 8 bits (e.g. −2, or 257). A number of well-understood techniques exist to rectify this situation, some of them proactive and some of them reactive. Among these known techniques are: specifying that the digitized voice data shall not have samples in the range of 0-4 or 241-255, thereby safely permitting combination with the scaled noise signal; and including provision for detecting and adaptively modifying digitized voice samples that would otherwise cause rail errors.)

Returning to the telephone 10, an encoder 36 like that detailed above is desirably interposed between the A/D converter 18 and the data formatter 20, thereby serving to steganographically encode all voice transmissions with the auxiliary data. Moreover, the circuitry or software controlling operation of the telephone is arranged so that the auxiliary data is encoded repeatedly. That is, when all bits of the auxiliary data have been encoded, a pointer loops back and causes the auxiliary data to be applied to the encoder 36 anew. (The auxiliary data may be stored at a known address in RAM memory for ease of reference.)

It will be recognized that the auxiliary data in the illustrated embodiment is transmitted at a rate one-eighth that of the voice data. That is, for every 8-bit sample of voice data, scaled noise data corresponding to a single bit of the auxiliary data is sent. Thus, if voice samples are sent at a rate of 4800 samples/second, auxiliary data can be sent at a rate of 4800 bits/second. If the auxiliary data is comprised of 8-bit symbols, auxiliary data can be conveyed at a rate of 600 symbols/second. If the auxiliary data consists of a string of even 60 symbols, each second of voice conveys the auxiliary data ten times. (Significantly higher auxiliary data rates can be achieved by resorting to more efficient coding techniques, such as limited-symbol codes (e.g. 5- or 6-bit codes), Huffman coding, etc.) This highly redundant transmission of the auxiliary data permits lower amplitude scaled noise data to be used while still providing sufficient signal-to-noise headroom to assure reliable decoding—even in the relatively noisy environment associated with radio transmissions.

Figure 3:
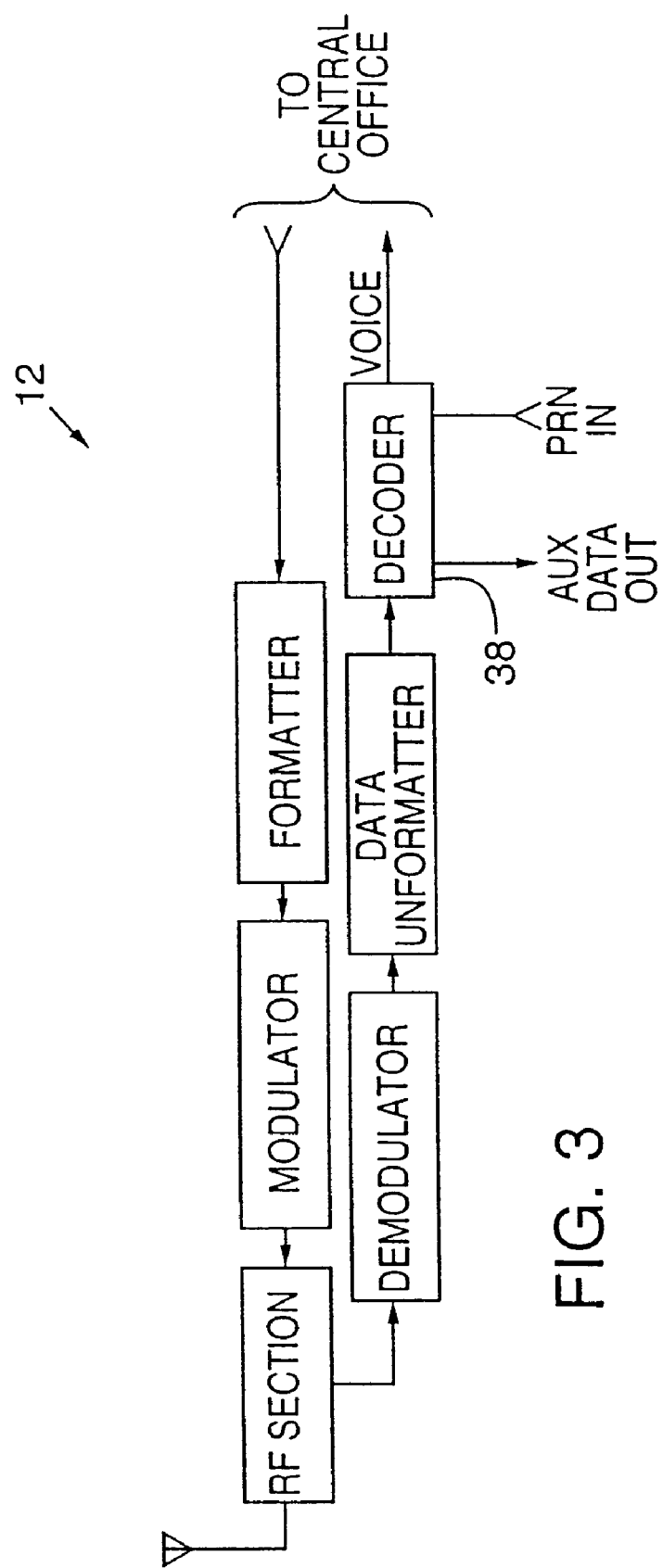
FIG. 3 is a block diagram of an exemplary steganographic decoder that can be used in the cell site of the FIG. 1 system.

Turning now to FIG. 3, each cell site 12 has a steganographic decoder 38 by which it can analyze the composite data signal broadcast by the telephone 10 to discern and separate the auxiliary data and digitized voice data therefrom. (The decoder desirably works on unformatted data (i.e. data with the packet overhead, control and administrative bits removed; this is not shown for clarity of illustration).

The decoding of an unknown embedded signal (i.e. the encoded auxiliary signal) from an unknown voice signal is best done by some form of statistical analysis of the composite data signal.

In one approach, decoding relies on recombining the composite data signal with PRN data (identical to that used during encoding), and analyzing the entropy of the resulting signal. "Entropy" need not be understood in its most strict mathematical definition, it being merely the most concise word to describe randomness (noise, smoothness, snowiness, etc.).

Most serial data signals are not random. That is, one sample usually correlates—to some degree—with adjacent samples. This is true in sampled voice signals.

Noise, in contrast, typically is random. If a random signal (e.g. noise) is added to (or subtracted from) a non-random signal (e.g. voice), the entropy of the resulting signal generally increases. That is, the resulting signal has more random variations than the original signal. This is the case with the composite data signal produced by encoder 36; it has more entropy than the original, digitized voice data.

If, in contrast, the addition of a random signal to (or subtraction from) a non-random (e.g. voice) signal reduces entropy, then something unusual is happening. It is this anomaly that can be used to decode the composite data signal.

To fully understand this entropy-based decoding method, it is first helpful to highlight a characteristic of the original encoding process: the similar treatment of every Nth (e.g. 480th) sample.

In the encoding process discussed above, the auxiliary data is 480 bits long. Since it is encoded repeatedly, every 480th sample of the composite data signal corresponds to the same bit of the auxiliary data. If this bit is a "1", the scaled PRN data corresponding thereto are added to the digitized voice signal; if this bit is a "0", the scaled PRN data corresponding thereto are subtracted. Due to the repeated encoding of the auxiliary data, every 480th sample of the composite data signal thus shares a characteristic: they are all either augmented by the corresponding noise data (which may be negative), or they are all diminished, depending on whether the bit of the auxiliary data is a "1" or a "0".

To exploit this characteristic, the entropy-based decoding process treats every 480th sample of the composite signal in like fashion. In particular, the process begins by adding to the 1st, 481st, 961st, etc. samples of the composite data signal the PRN data with which these samples were encoded. (That is, a set of sparse PRN data is added: the original PRN set, with all but every 480th datum zeroed out.) The localized entropy of the resulting signal around these points (i.e. the composite data signal with every 480th sample modified) is then computed.

(Computation of a signal's entropy or randomness is well understood by artisans in this field. One generally accepted technique is to take the derivative of the signal at each sample point near a point in question (e.g. the modified sample and 4 samples either side), square these values, and then sum the resulting signals over all of the localized regions over the entire signal. A variety of other well known techniques can alternatively be used.)

The foregoing step is then repeated, this time subtracting the PRN data corresponding thereto from the 1st, 481st, 961st, etc. composite data samples.

One of these two operations will counteract (e.g. undo) the encoding process and reduce the resulting signal's entropy; the other will aggravate it. If adding the sparse PRN data to the composite data reduces its entropy, then this data must earlier have been subtracted from the original voice signal. This indicates that the corresponding bit of the auxiliary data signal was a "0" when these samples were encoded. (A "0" at the auxiliary data input of logic circuit 46 caused it to produce an inverted version of the corresponding PRN datum as its output datum, resulting in subtraction of the corresponding PRN datum from the voice signal.)

Conversely, if subtracting the sparse PRN data from the composite data reduces its entropy, then the encoding process must have earlier added this noise. This indicates that the value of the auxiliary data bit was a "1" when samples 1, 481, 961, etc., were encoded.

By noting in which case entropy is lower by (a) adding or (b) subtracting a sparse set of PRN data to/from the composite data, it can be determined whether the first bit of the auxiliary data is (a) a "0", or (b) a "1." (In real life applications, in the presence of various distorting phenomena, the composite signal may be sufficiently corrupted so that neither adding nor subtracting the sparse PRN data actually reduces entropy. Instead, both operations will increase entropy. In this case, the "correct" operation can be discerned by observing which operation increases the entropy less.)

The foregoing operations can then be conducted for the group of spaced samples of the composite data beginning with the second sample (i.e. 2, 482, 962, . . . ). The entropy of the resulting signals indicate whether the second bit of the auxiliary data signal is a "0" or a "1." Likewise with the following 478 groups of spaced samples in the composite signal, until all 480 bits of the code word have been discerned.

It will be appreciated that the foregoing approach is not sensitive to corruption mechanisms that alter the values of individual samples; instead, the process considers the entropy of spaced excerpts of the composite data, yielding a high degree of confidence in the results.

A second and probably more common decoding technique is based on correlation between the composite data signal and the PRN data. Such operations are facilitated in the present context since the auxiliary data whose encoded representation is sought, is known, at least in large part, a priori. (In one arrangement, the auxiliary data is based on the authentication data exchanged at call set-up, which the cellular system has already received and logged; in another form (detailed below), the auxiliary data comprises a predetermined message.) Thus, the problem can be reduced to determining whether an expected signal is present or not (rather than looking for an entirely unknown signal). Moreover, data formatter 20 breaks the composite data into frames of known length. (In a known GSM implementation, voice data is sent in time slots which convey 114 data bits each.) By padding the auxiliary data as necessary, each repetition of the auxiliary data can be made to start, e.g., at the beginning of such a frame of data. This, too, simplifies the correlation determinations, since 113 of every 114 possible bit alignments can be ignored (facilitating decoding even if none of the auxiliary data is known a priori).

Classically speaking, the detection of the embedded auxiliary data fits nicely into the old art of detecting known signals in noise. Noise in this last statement can be interpreted very broadly, even to the point where the subscriber's voice can be considered noise, relative to the need to detect the underlying auxiliary data. One of many references to this older art is the book Kassam, Saleem A., "Signal Detection in Non-Guassian Noise," Springer-Verlag, 1988 (available at the Library of Congress by catalog number TK5102.5 .K357 1988).

In particular, section 1.2 "Basic Concepts of Hypothesis Testing" of Kassam's book lays out the basic concept of a binary hypothesis, assigning the value "1" to one hypothesis and the value "0" to the other hypothesis. The last paragraph of that section is also on, i.e., that the "0" hypothesis corresponds to "noise only" case, whereas the "1" corresponds to the presence of a signal in the observations. In the current preferred embodiment, the case of "noise-only" is effectively ignored, and that an identification process will either come up with our N-bit identification word or it will come up with "garbage."

The continued and inevitable engineering improvement in the detection of embedded code signals will undoubtedly borrow heavily from this generic field of known signal detection. A common and well-known technique in this field is the so-called "matched filter," which is incidentally discussed early in section 2 of the Kassam book. Many basic texts on signal processing include discussions on this method of signal detection. This is also known in some fields as correlation detection. Where, as here, the location of the auxiliary signal is known a priori (or more accurately, known to fall within one of a few discrete locations, as discussed above), then the matched filter can often be reduced to a simple vector dot product between a set of sparse PRN data, and mean-removed excerpts of the composite signal corresponding thereto. (Note that the PRN data need not be sparse and may arrive in contiguous bursts, such as in British patent publication 2,196,167 mentioned earlier wherein a given bit in a message has contiguous PRN values associated with it.) Such a process steps through all 480 sparse sets of PRN data and performs corresponding dot product operations. If the dot product is positive, the corresponding bit of the auxiliary data signal is a "1;" if the dot product is negative, the corresponding bit of the auxiliary data signal is a "0." If several alignments of the auxiliary data signal within the framed composite signal are possible, this procedure is repeated at each candidate alignment, and the one yielding the highest correlation is taken as true. (Once the correct alignment is determined for a single bit of the auxiliary data signal, the alignment of all the other bits can be determined therefrom. Alignment, perhaps better known as synchronization, can be achieved by primarily through the very same mechanisms which lock on and track the voice signal itself and allow for the basic functioning of the cellular unit).

Figure 4A:
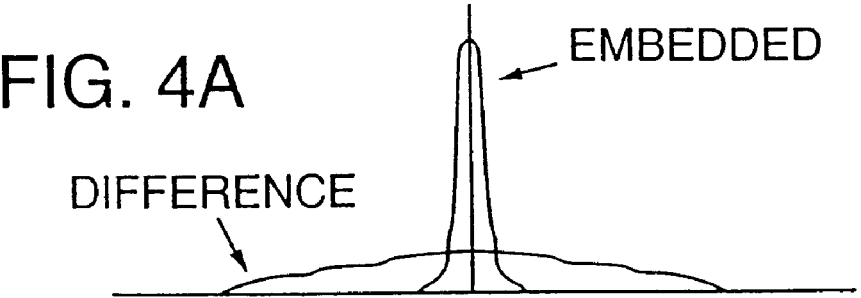
FIGS. 4A and 4B are histograms illustrating signal relationships which may be exploited to facilitate decoding.
Figure 4B:
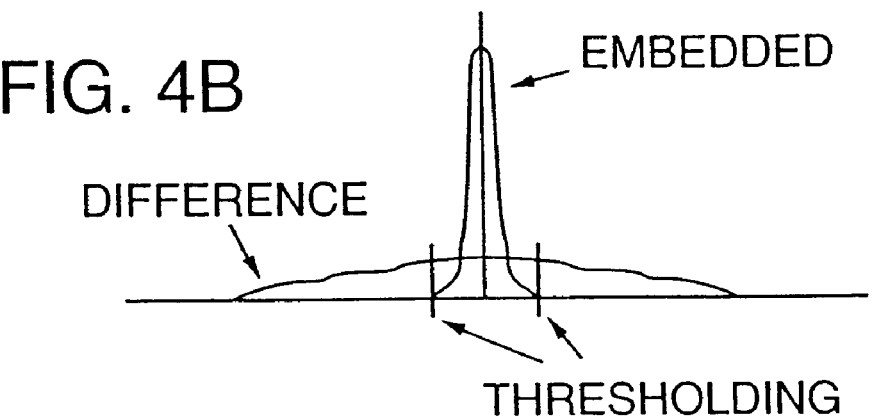

One principle which did not seem to be explicitly present in the Kassam book and which was developed rudimentarily by the applicant involves the exploitation of the magnitudes of the statistical properties of the auxiliary data signal being sought relative to the magnitude of the statistical properties of the composite signal as a whole. In particular, the problematic case seems to be where the auxiliary data signals we are looking for are of much lower level than the noise and corruption present on a difference signal between the composite and digitized voice signals. FIG. 4 attempts to set the stage for the reasoning behind this approach. FIG. 4A contains a generic look at the differences in the histograms between a typical "problematic" difference signal, i.e., a difference signal which has a much higher overall energy than the auxiliary data that may or may not be within it. The term "mean-removed" simply means that the means of both the difference signal and the auxiliary data have been removed, a common operation prior to performing a normalized dot product. FIG. 4B then has a generally similar histogram plot of the derivatives of the two signals. From pure inspection it can be seen that a simple thresholding operation in the derivative transform domain, with a subsequent conversion back into the signal domain, will go a long way toward removing certain innate biases on the dot product "recognition algorithm" of a few paragraphs back. Thresholding here refers to the idea that if the absolute value of a difference signal derivative value exceeds some threshold, then it is replaced simply by that threshold value. The threshold value can be so chosen to contain most of the histogram of the embedded signal.

Another operation which can be of minor assistance in "alleviating" some of the bias effects in the dot product algorithm is the removal of the low order frequencies by, e.g., high pass filtering with a cutoff near the origin.

Security Considerations

Security of the detailed arrangement depends, in large part, on security of the PRN data and/or security of the auxiliary data. In the following discussion, a few of many possible techniques for assuring the security of these data are discussed.

In a first embodiment, each telephone 10 is provided with a long noise key unique to the telephone. This key may be, e.g., a highly unique 10,000 bit string stored in ROM. (In most applications, keys substantially shorter than this may be used.)

The central office 14 has access to a secure disk 52 on which such key data for all authorized telephones are stored. (The disk may be remote from the office itself.)

Each time the telephone is used, fifty bits from this noise key are identified and used as the seed for a deterministic pseudo random number generator. The data generated by this PRN generator serve as the PRN data for that telephone call.

The fifty bit seed can be determined, e.g., by using a random number generator in the telephone to generate an offset address between 0 and 9,950 each time the telephone is used to place a call. The fifty bits in the noise key beginning at this offset address are used as the seed.

During call setup, this offset address is transmitted by the telephone, through the cell site 12, to the central office 14. There, a computer at the central office uses the offset address to index its copy of the noise key for that telephone. The central office thereby identifies the same 50 bit seed as was identified at the telephone. The central office 14 then relays these 50 bits to the cell site 12, where a deterministic noise generator like that in the telephone generates a PRN sequence corresponding to the 50 bit key and applies same to its decoder 38.

By the foregoing process, the same sequence of PRN data is generated both at the telephone and at the cell site. Accordingly, the auxiliary data encoded on the voice data by the telephone can be securely transmitted to, and accurately decoded by, the cell site. If this auxiliary data does not match the expected auxiliary data (e.g. data transmitted at call set-up), the call is flagged as fraudulent and appropriate remedial action is taken.

It will be recognized that an eavesdropper listening to radio transmission of call set-up information can intercept only the randomly generated offset address transmitted by the telephone to the cell site. This data, alone, is useless in pirating calls. Even if the hacker had access to the signals provided from the central office to the cell site, this data too is essentially useless: all that is provided is a 50 bit seed. Since this seed is different for nearly each call (repeating only 1 out of every 9,950 calls), it too is unavailing to the hacker.

In a related system, the entire 10,000 bit noise key can be used as a seed. An offset address randomly generated by the telephone during call set-up can be used to identify where, in the PRN data resulting from that seed, the PRN data to be used for that session is to begin. (Assuming 4800 voice samples per second, 4800 PRN data are required per second, or about 17 million PRN data per hour. Accordingly, the offset address in this variant embodiment will likely be far larger than the offset address described above.)

In this variant embodiment, the PRN data used for decoding is preferably generated at the central station from the 10,000 bit seed, and relayed to the cell site. (For security reasons, the 10,000 bit noise key should not leave the security of the central office.)

In variants of the foregoing systems, the offset address can be generated by the central station or at the cell site, and relayed to the telephone during call set-up, rather than vice versa.

In another embodiment, the telephone 10 may be provided with a list of one-time seeds, matching a list of seeds stored on the secure disk 52 at the central office. Each time the telephone is used to originate a new call, the next seed in the list is used. By this arrangement, no data needs to be exchanged relating to the seed; the telephone and the carrier each independently know which seed to use to generate the pseudo random data sequence for the current session.

In such an embodiment, the carrier can determine when the telephone has nearly exhausted its list of seeds, and can transmit a substitute list (e.g. as part of administrative data occasionally provided to the telephone). To enhance security, the carrier may require that the telephone be returned for manual reprogramming, to avoid radio transmission of this sensitive information. Alternatively, the substitute seed list can be encrypted for radio transmission using any of a variety of well known techniques.

In a second class of embodiments, security derives not from the security of the PRN data, but from security of the auxiliary message data encoded thereby. One such system relies on transmission of a randomly selected one of 256 possible messages.

In this embodiment, a ROM in the telephone stores 256 different messages (each message may be, e.g., 128 bits in length). When the telephone is operated to initiate a call, the telephone randomly generates a number between 1 and 256, which serves as an index to these stored messages. This index is transmitted to the cell site during call set-up, allowing the central station to identify the expected message from a matching database on secure disk 52 containing the same 256 messages. (Each telephone has a different collection of messages.) (Alternatively, the carrier may randomly select the index number during call set-up and transmit it to the telephone, identifying the message to be used during that session.) In a theoretically pure world where proposed attacks to a secure system are only mathematical in nature, much of these additional layers of security might seem superfluous. (The addition of these extra layers of security, such as differing the messages themselves, simply acknowledge that the designer of actual public-functioning secure systems will face certain implementation economics which might compromise the mathematical security of the underlying principles of this technology, and thus these auxiliary layers of security may afford new tools against the inevitable attacks on implementation).

Thereafter, all voice data transmitted by the telephone for the duration of that call is steganographically encoded with the indexed message. The cell site checks the data received from the telephone for the presence of the expected message. If the message is absent, or if a different message is decoded instead, the call is flagged as fraudulent and remedial action is taken.

In this second embodiment, the PRN data used for encoding and decoding can be as simple or complex as desired. A simple system may use the same PRN data for each call. Such data may be generated, e.g., by a deterministic PRN generator seeded with fixed data unique to the telephone and known also by the central station (e.g. a telephone identifier), or a universal noise sequence can be used (i.e. the same noise sequence can be used for all telephones). Or the pseudo random data can be generated by a deterministic PRN generator seeded with data that changes from call to call (e.g. based on data transmitted during call set-up identifying, e.g., the destination telephone number, etc.). Some embodiments may seed the pseudo random number generator with data from a preceding call (since this data is necessarily known to the telephone and the carrier, but is likely not known to pirates).

Naturally, elements from the foregoing two approaches can be combined in various ways, and supplemented by other features. The foregoing embodiments are exemplary only, and do not begin to catalog the myriad approaches which may be used. Generally speaking, any data which is necessarily known or knowable by both the telephone and the cell site/central station, can be used as the basis for either the auxiliary message data, or the PRN data by which it is encoded.

Since the detailed arrangements each redundantly encodes the auxiliary data throughout the duration of the subscriber's digitized voice, the auxiliary data can be decoded from any brief sample of received audio. In the detailed arrangements, the carrier repeatedly checks the steganographically encoded auxiliary data (e.g. every 10 seconds, or at random intervals) to assure that it continues to have the expected attributes.

While the foregoing discussion has focused on steganographically encoding a transmission from a cellular telephone, it will be recognized that transmissions to a cellular telephone can be steganographically encoded as well. Such arrangements find applicability, e.g., in conveying administrative data (i.e. non-voice data) from the carrier to individual telephones. This administrative data can be used, for example, to reprogram parameters of targeted cellular telephones (or all cellular telephones) from a central location, to update seed lists (for systems employing the above-described on-time pad system), to apprise "roaming" cellular telephones of data unique to an unfamiliar local area, etc.

In some embodiments, the carrier may steganographically transmit to the cellular telephone a seed which the cellular phone is to use in its transmissions to the carrier during the remainder of that session.

While the foregoing discussion has focused on steganographic encoding of the baseband digitized voice data, artisans will recognize that intermediate frequency signals (whether analog or digital) can likewise be steganographically encoded. An advantage of post-baseband encoding is that the bandwidth of these intermediate signals is relatively large compared with the baseband signal, allowing more auxiliary data to be encoded therein, or allowing a fixed amount of auxiliary data to be repeated more frequently during transmission. (If steganographic encoding of an intermediate signal is employed, care should be taken that the perturbations introduced by the encoding are not so large as to interfere with reliable transmission of the administrative data, taking into account any error correcting facilities supported by the packet format).

Those skilled in the art will recognize that the auxiliary data, itself, can be arranged in known ways to support error detecting, or error correcting capabilities by the decoder 38. The interested reader is referred, e.g., to Rorabaugh, *Error Coding Cookbook*, McGraw Hill, 1996, one of many readily available texts detailing such techniques.

While the preferred embodiment is illustrated in the context of a cellular system utilizing packetized data, other wireless systems do not employ such conveniently framed data. In systems in which framing is not available as an aid to synchronization, synchronization marking can be achieved within the composite data signal by techniques such as that detailed in applicant's prior applications. In one class of such techniques, the auxiliary data itself has characteristics facilitating its synchronization. In another class of techniques, the auxiliary data modulates one or more embedded carrier patterns which are designed to facilitate alignment and detection.

As noted earlier, the disclosed technological principles are not restricted to use with the particular forms of steganographic encoding detailed above. Indeed, any steganographic encoding technique previously known, or hereafter devised, can be used in the fashion detailed above to enhance the security or functionality of cellular (or other wireless, e.g. PCS) communications systems. Likewise, these principles are not restricted to wireless telephones; any wireless transmission may be provided with an "in-band" channel of this type.

It will be recognized that systems for implementing the detailed arrangements can comprise dedicated hardware circuit elements, but more commonly comprise suitably programmed microprocessors with associated RAM and ROM memory (e.g. one such system in each of the telephone 10, cell-site 12, and central office 14).

Errata

Applicant is preparing a steganographic marking/decoding "plug-in" for use with Adobe Photoshop software. The latest version of this software, presented as commented source code, was filed in application Ser. No. 08/637,531 (now U.S. Pat. No. 5,822,436). The code was written for compilation with Microsoft's Visual C++ compiler, version 4.0, and can be understood by those skilled in the art.

This source code embodies several improvements to the technology disclosed in applicant's prior applications, both in encoding and decoding, and also in user interface.

Applicant's copyrights in the code are reserved, save for permission to reproduce same as part of the specification of the patent.

While the cited software is particularly designed for the steganographic encoding and decoding of auxiliary data in/from two-dimensional image data, many principles thereof are applicable to the encoding of digitized audio.

Before concluding, it may be instructive to review some of the other fields where principles of applicant's technology (both in this application, and prior applications) can be employed.

One is document security for passports, visas, "green cards," etc. The photos on such documents can be processed to embed a subliminal data signal therein, serving to authenticate the document.

Related to the foregoing are objects (e.g. photos and ID cards) having biometric data embedded therein. One example of such biometric data is a fingerprint, allowing the authenticity of a person bearing such an ID to be checked.

Another application is smart business cards, wherein a business card is provided with a photograph having unobtrusive, machine-readable contact data embedded therein. (The same function can be achieved by changing the surface microtopology of the card to embed the data therein.)

Yet another promising application is in content regulation. Television signals, images on the internet, and other content sources (audio, image, video, etc.) can have data indicating their "appropriateness" (i.e. their rating for sex, violence, suitability for children, etc.) actually embedded in the content itself rather than externally associated therewith. Television receivers, web browsers, etc., can discern such appropriateness ratings (e.g. by use of universal code decoding) and can take appropriate action (e.g. not permitting viewing of an image or video, or play-back of an audio source).

Credit cards are also likely candidates for enhancement by use of steganographic marking, providing an invisible and covert data carrier to extend functionality and improve security.

The field of merchandise marking is generally well served by familiar bar codes and universal product codes. However, in certain applications, such bar codes are undesirable (e.g. for aesthetic considerations, or where security is a concern). In such applications, applicant's technology may be used to mark merchandise, either through in innocuous carrier (e.g. a photograph associated with the product), or by encoding the microtopology of the merchandise's surface, or a label thereon.

There are applications—too numerous to detail—in which steganography can advantageously be combined with encryption and/or digital signature technology to provide enhanced security.

Medical records appear to be an area in which authentication is important. Steganographic principles—applied either to film-based records or to the microtopology of documents—can be employed to provide some protection against tampering.

Many industries, e.g. automobile and airline, rely on tags to mark critical parts. Such tags, however, are easily removed, and can often be counterfeited. In applications wherein better security is desired, industrial parts can be steganographically marked to provide an inconspicuous identification/authentication tag.

In various of the applications reviewed above and in applicant's earlier applications, different messages can be steganographically conveyed by different regions of an image (e.g. different regions of an image can provide different internet URLs, or different regions of a photocollage can identify different photographers). Likewise with other media (e.g. sound).

Some software visionaries look to the day when data blobs will roam the datawaves and interact with other data blobs. In such era, it will be necessary that such blobs have robust and incorruptible ways to identify themselves. Steganographic techniques again hold much promise here.

Finally, message changing codes—recursive systems in which steganographically encoded messages actually change underlying steganographic code patterns—offer new levels of sophistication and security. Such message changing codes are particularly well suited to applications such as plastic cash cards where time-changing elements are important to enhance security.

Again, while applicant prefers the particular forms of steganographic encoding, the foregoing applications (and applications disclosed in applicant's prior applications) can be practiced with other steganographic marking techniques.

Further Disclosure

The current prevalence of mobile telephone devices with high quality imaging and display systems (including, e.g., camera phones, PDAs, iPhones, Blackberries, etc.—generally referred to as "cell phones" in the discussion that follows) offers further opportunities for digital watermark technology.

Consider an object (e.g., a magazine advertisement, a product package, an automotive part, a pharmaceutical tablet, a driver's license, etc.) that conveys a digital watermark signal, and is imaged by the imaging system of a mobile device. Upon detection of a steganographic marking in image data captured by the imaging system, the device's image processing/display system superimposes a characteristic marking on the object as presented to the user on the device's screen. In one embodiment, graphic sprites—such as sparkles or fireworks or an animated character—are overlaid on the image. "Blitting" of the image display buffer with the overlay data is one approach by which this effect may be achieved.

The graphic overlay can be placed—in the displayed image—in registered alignment with the watermark on the imaged object. For examples, sparks can be made to shoot out from a watermarked corporate logo. Or a flashing yellow oval can be made to appear around a watermarked pharmaceutical tablet.

Correct registration of the graphic overlay, and affine transformation of the overlay to properly match the apparent distortion of the object as viewed by the imaging system, can be accomplished by reference to a calibration signal sensed from the steganographic watermark. Such calibration signal can be in addition to a plural-bit auxiliary data signal encoded by the watermark, or may be present without any auxiliary data.

Steganographic calibration signals by which affine distortion of an imaged object can be accurately quantified are detailed, e.g., in U.S. Pat. Nos. 6,614,914 and 6,580,809; in publications US20040105569 and US20040101157, and in pending application Ser. No. 11/198,004, filed Aug. 5, 2005. (now published as US20060031684). U.S. Pat. No. 6,959,098 teaches how distortion can be characterized by such watermark calibration signals in conjunction with visible image features (e.g., edges of a rectilinear object). From such affine distortion information, the 6D location of the watermarked object (x, y, z, tip, tilt, rotation) relative to the mobile phone's imager can be determined. The calibration signal(s) detected from the imagery can serve as a graphic framework relative to which the overlayed features can be positioned.

In other embodiments, the special effects presented with the imaged portion of the object can be aligned by reference to visible features of the object - such as its edges, or margins. Or, in simpler embodiments, the overlaid special effects aren't particularly warped in correspondence with the object. Nor do they even need to be positioned in correspondence with the object's position in the displayed image data.

Technology for identifying a watermarked excerpt within an image frame is detailed in published application 20050160271.

Viewing a steganographically-marked object through use of a device such as detailed herein is akin to viewing an object marked by ultraviolet-responsive ink under ultraviolet illumination—it allows the user to perceive additional features that are not otherwise visible. However, in this case, at least some of the additional features are added (e.g., by the cell phone), in response to detection of steganographic features.

This arrangement can be used as a visual check of object authenticity (assuming the correct steganographic marking is found only on genuine objects). Authentic objects trigger a special response when imaged by such an imaging device.

The particular graphic that is overlaid onto the screen can have many different forms. A simple example is a yellow oval—either sized to surround the watermarked object in the display, or bordering the edge of the display (regardless of where the watermarked object is within the field of view). Another example is a logo—either centered on the watermarked object, or at a fixed location on the screen. The displayed graphic may incorporate movement—such as an animated arrow or dashed line that dynamically circles around the watermarked feature presented in the display. (The displayed feature may be comprised of one or more graphic primitives, stored either in the cell phone or at a remote server, which are assembled to yield a composite graphic.)

The foregoing examples may be triggered responsive to detection of any watermark. In other cases, the response may be dependent on particular payload bits discerned from a watermark. For example, the sensed watermark may convey 8 or 16 bits of data, by reference to which the displayed feature may be customized (e.g., color, location on the screen, component primitives, etc.) This customization can be performed by the cell phone processor, or by a remote server.

In still another example, the payload bits discerned from the watermark can be used to look-up logos, graphics, animations, or instructions stored in the cell phone memory. In a related example, the payload bits can be used to look-up such information in a remote data structure (e.g., by HTTP protocol and interchanges), which data structure may be accessed wirelessly (e.g., PCS, WiFi, WiMax, Bluetooth, EVDO, etc.).

In one particular arrangement, the decoded watermark payload serves as an index to a remote web server that returns a graphic that is to be overlaid on the sensed object. A watermarked Nike logo, for example, may correspond to a textual overlay "Just Do It!"

A displayed graphic can also provide textual user instructions, e.g., informing the user as to what buttons on the device can be operated to trigger different operations. The watermark in a print advertisement for the Los Angeles Galaxy soccer team, showing a picture of soccer player David Beckham, can trigger display of an overlay such as "Press 1 to see the Beckham video clip; Press 2 to buy tickets to Friday night's game," etc.

In addition, or alternatively, the action triggered in response to detection of the watermark can be one that corresponds in some way to (e.g., is dependent on) data available at the device. For example, the rendered response can be tailored in accordance with a user ID, age, screen orientation, screen resolution, GPS-determined geographic location, etc.

The overlay introduced on the device display in response to detection of the marking may be translucent (i.e., some representation of the underlying object may be visible through the overlay), or the overlay may be opaque (i.e., fully obscuring the object, hidden beneath).

The watermark payload may also index a corresponding piece of software code (e.g., stored on a remote server), which is executed on the cell phone processor when the watermark is detected. Execution of this code can again employ local data stored in the cell phone's memory, e.g., permitting customization of the executing code to the particular device/user/context. Copending application Ser. No. 11/614,942, filed Dec. 21, 2006, has a great deal of information about how an identifier extracted from an object can be used to link to a large repository of related information (meta-data). Such methods and systems are well suited for use with the presently-described technologies. (Likewise, the technologies detailed herein can be used in embodiments of the '942 application.)

In some embodiments, several different actions may be taken, in a sequence, when a watermarked object is viewed by the imager. For example, as soon as any watermark has been detected, the phone can present a distinctive chime, or can display an introductory graphic/animation—signaling to a user that something special is underway. This can happen very quickly (e.g., simply by detecting presence of a watermark calibration signal)—without any remote data exchanges. Then, once the watermark has been decoded and plural payload bits are available (which decoding may be performed locally, or by transmitting image-related data to a remote server which performs the decoding), a response particularly corresponding to the decoded payload can be presented.

The cell phone's action in response to detection of a watermarked excerpt in a frame of captured image data can also depend on input provided by the user. In one case the input takes the form of cell phone motion. For example, if the cell phone is held still while viewing a watermarked object, a static overlay may be presented on the screen (e.g., a yellow rectangle), whereas if the cell phone is moved while viewing the object, a dynamic overlay may be presented (e.g., fireworks shooting from the object as it moves). In another arrangement, if the cell phone is moved so the watermarked object moves up and down in the display, a first type of response can be triggered. A different response can be triggered by moving the cell phone (or the object) side to side, or in a figure-eight pattern. Etc. (Gestural interaction by cell phones is further detailed in U.S. Pat. No. 6,947,571.) The input can also be provided through different user interface mechanisms, such as the cell phone keypad, touchpad, voice recognition, fingerprint or other biometric detection, etc. The different response invoked by user input can serve to tailor the graphic overlaid on the display. Additionally, or alternatively, it can trigger other cell phone responses, such as providing a password to a password-protected resource, e.g., a bank account, or Facebook or MySpace web page.

U.S. Pat. No. 6,947,571 details a great variety of responses that can be triggered by detection of a watermark signal. Each of those arrangements can be adapted to the present context, e.g., with the response taking the form of an overlay (translucent or not) presented on the cell phone display. Other techniques and arrangements detailed in the '571 patent can likewise be employed in the present arrangements (and, conversely, technologies detailed herein can be incorporated into arrangements detailed in the '571 patent).

In some embodiments, the mobile device may have a distinct operational mode in which it responds in the foregoing manners when a watermarked object is sensed. This mode can be turned on and off by the user. In other embodiments, the device is always on the lookout for a watermarked object (e.g., interrogating images for watermarks), and ready to present extra graphics—or other responses—whenever such an object is sensed. (In the former embodiment, the cell phone can present an "invalid" pattern on the screen unless/until a watermarked object is imaged. One "invalid" pattern is the word NO superimposed across the screen. Another is a red circle with a diagonal line through it.)

Cell phones and like devices commonly use CCD or CMOS image sensors that include red, green and blue sensing elements arrayed in a "Bayer" pattern. By knowledge of the sensor configuration, the steganographic encoding pattern may be optimized for detection by the thus-configured sensor. An object marked with such a watermark may—as it is moved closer to the sensor, suddenly strobe, or be given another distinctive graphical effect—when its Bayer-encoding registers with the Bayer encoding of the cell phone sensor.

The features that trigger the cell phone to present distinctive graphics with the imaged object need not be steganographic. Overt image features that signal a particular object (e.g., a valid pharmaceutical package) can also be sensed from the image data by the device processor and—if detected—the distinctive graphics may be applied. One class of such visible features is detailed in U.S. Pat. No. 6,871,789.

Still further, such features may be caused to be overlaid on a screen display in response to detection of other, non-image, data. An example is detection of a signal from an RFID chip. As above, the particular overlay graphic presented on the display can be determined by reference to the payload data conveyed by such chip. Or a generic response can be triggered regardless of the particular data conveyed.

While the foregoing discussion has focused on steganography, a signal can also be represented (hidden, or not) through other means. Barcodes are OCRs are familiar examples. Image "fingerprints" are others (e.g., recognizing a Coke or Nike logo by its distinctive shape, color, and/or other characterizing feature(s)). Still others are detailed in copending application Ser. No. 11/625,125, filed Jan. 19, 2007. Such techniques may be used to glean an identifying signal from an object (e.g., a driver license) and—if detected—such signal can trigger presentation of a display on the cell phone screen (e.g., one that visibly signals that the license appears to be valid). Thus, watermarking is not essential.

The action triggered in response need not take the form of a graphic overlay. Other responses are also contemplated, such as vibration, chimes, spoken words, flashing indicator LEDs, etc.

It may be recognized that any publicly deployed "detector" of a signal (regardless of channel) that generates a binary result ("Signal" vs. "No Signal") creates something of an oracle for attack. If, instead, the pattern matching, error correction and/or ultimate Yes/No answer is generated by the end user—not the device—this threat would be mitigated. In this modality, the device simply becomes an electronic replacement for an aid such as a magnifying glass. An example of such a system would be a device (e.g., a cell phone) that upon imaging a feature comprised of an increasing frequency of lines (perhaps viewable only at an acute angle) would play a tone represented by the line structure. The user would be the ultimate arbiter of whether the correct signal was produced.

Sample cell phones that are suited for use with the presently-detailed technology include the Sprint PPC-6700 pocket PC, and the Cingular 8525 smart phone. The former (manufactured by HTC) runs Microsoft Windows Mobile 5.0 on a 416 MHz processor, with 64 megs of RAM, 128 megs of flash ROM, a mini-SD card, a 1.3 megapixel camera (including a selectable macro lens), and a 2.8" QVGA display, together with Bluetooth and EDVO data interfaces (as well as the cellular interfaces). The latter (also made by HTC) likewise is equipped with the Microsoft Windows Mobile 5.0 operating system, but runs on a 400 MHz Samsung SC32442A processor, again with 64 megs of RAM and 128 megs of flash ROM. The camera is 2 megapixels. The Cingular device also has a 2.8" QVGA display screen, but with an ATI Imageon 2282 graphics processor, and provides GPRS, EDGE, UMTS and HSDPA data interfaces. Further details and specifications of these cell phones are readily available and are familiar to the artisan.

One particular method according to the foregoing comprises capturing image data corresponding to a field of view that encompasses at least part of an object bearing steganographic encoding (using, e.g., a 2D optical sensor and associated lens arrangement); detecting the steganographic encoding; and, as a consequence of the detected steganographic encoding, presenting a graphic feature on the display together with at least some of said image data.

The cell phone may include plural buttons, and the graphic feature presented on the display can aid a user in operating said buttons in furtherance of an objective.

If the location of the object within the field of view changes, the method can include similarly changing the position on said display at which the feature is presented.

By reference to the steganographic encoding, affine distortion of the object as represented in the image data can be at least partially characterized. A warped graphic feature that is similarly affine-distorted can then be generated, and presented on the display. The graphic feature can further be presented in spatial registration with the object on the display.

The method can further include decoding auxiliary data represented by the steganographic encoding; indexing a data store based—at least in part—on the decoded auxiliary data; executing a procedure based—at least in part—on data indexed in the data store (which procedure causes the graphic feature to be presented on the cell phone display; wherein the feature is presented on the display in a location related to the location of the watermarked object within the field of view.

The decoding of the watermark data (and/or the executing of a corresponding procedure) can be performed by the cell phone processor. Alternatively, captured image data can be transmitted to a remote device, which then performs the decoding (and/or the executing) operation(s)

To provide a comprehensive disclosure without unduly lengthening this specification, applicant incorporates by reference each of the patent applications and documents referenced herein.

Having described and illustrated the principles of my work with reference to various embodiments thereof, it should be apparent that the detailed technologies can be modified in arrangement and detail without departing from such principles. Moreover, I intend that features known from the incorporated-by-reference documents can be incorporated into the arrangements detailed herein.

Accordingly, I claim all such embodiments as come within the scope and spirit of the following claims and equivalents thereto.

I claim:

1. A method of operating a wireless telephone device including the acts:
   processing audio information two different ways, for two different purposes;
   the first way comprising processing the audio information to help generate a signal that drives an audio transducer associated with said device, so that a user can listen thereto;
   the second way comprising processing the audio information by applying an algorithm thereto to derive plural-bit data therefrom, and controlling an aspect of the device's operation based on said derived plural-bit data.

2. The method of claim 1, characterized by deriving said plural-bit data by reference to pseudo-random key information.

3. The method of claim 1, further characterized by filtering said audio information before deriving the plural-bit data.

4. The method of claim 1, further characterized by performing a mean-removal operation on said audio information before deriving the plural-bit data.

5. The method of claim 1 in which said deriving includes performing a matched filtering operation.

6. The method of claim 1 in which said deriving includes performing a correlation operation.

7. The method of claim 1 in which said deriving includes determining a correct alignment of the audio information before deriving the plural-bit data.

8. The method of claim 1 that includes receiving said audio information from a data channel on which it is sent in the form of packets.

9. The method of claim 1 in which the deriving includes decoding plural-bit data steganographically encoded in digital information wirelessly received by said device.

10. The method of claim 1 in which the deriving includes decoding plural-bit data steganographically encoded in digital audio information processed by said device.

11. A method for checking whether data transmitted in a telephone call has been altered, comprising:
    receiving a telephone call;
    extracting audio data from the telephone call; and
    checking whether the telephone call has been altered by using a hardware processor to (a) extract auxiliary data embedded in the audio data and (b) check whether the extracted auxiliary data satisfies a predetermined relationship with data associated with the telephone call.

12. A method comprising:
    receiving a 911 emergency call; and
    recording the call;
    wherein prior to said recording, the method includes using a hardware processor to steganographically encode the call with plural-bit hidden data so as to facilitate later authentication.

13. A wireless telephone device that includes a processor and a transducer, the processor being adapted to process audio information in two different ways, for two different purposes:
    the first way processing the audio information to help generate a signal that drives the transducer so that a user can listen thereto,
    the second way processing the audio information to derive plural-bit data,
    the processor further being operative to control an aspect of the wireless telephone device's operation based on the derived plural-bit data.

14. The device of claim 13 that further includes a microphone, a modulator, an antenna, and an RF amplifier.

15. The device of claim 13, in which said processing circuitry comprises a steganographic decoder operative to recover steganographically encoded data from audio information processed by said device.

16. A method of operating a wireless telephone device, the device processing digital samples representing audio information so that a user can listen thereto, characterized by applying an algorithm to said audio information to derive plural-bit data therefrom, and controlling an aspect of the device's operation based on said plural-bit data; characterized by deriving said plural-bit data by reference to pseudo-random key information.

17. A method of operating a wireless telephone device, the device processing digital samples representing audio information so that a user can listen thereto, characterized by applying an algorithm to said audio information to derive plural-bit data therefrom, and controlling an aspect of the device's operation based on said plural-bit data; characterized by filtering said audio information before deriving the plural-bit data.

18. A method of operating a wireless telephone device, the device processing digital samples representing audio information so that a user can listen thereto, characterized by applying an algorithm to said audio information to derive plural-bit data therefrom, and controlling an aspect of the device's operation based on said plural-bit data; characterized by performing a mean-removal operation on said audio information before deriving the plural-bit data.

19. A method of operating a wireless telephone device, the device processing digital samples representing audio information so that a user can listen thereto, characterized by applying an algorithm to said audio information to derive plural-bit data therefrom, and controlling an aspect of the device's operation based on said plural-bit data; wherein said deriving includes performing a matched filtering operation.

20. A method of operating a wireless telephone device, the device processing digital samples representing audio information so that a user can listen thereto, characterized by applying an algorithm to said audio information to derive plural-bit data therefrom, and controlling an aspect of the device's operation based on said plural-bit data; wherein said deriving includes performing a correlation operation.

21. A method of operating a wireless telephone device, the device processing digital samples representing audio information so that a user can listen thereto, characterized by applying an algorithm to said audio information to derive plural-bit data therefrom, and controlling an aspect of the device's operation based on said plural-bit data; wherein said deriving includes determining a correct alignment of the audio information before deriving the plural-bit data.

* * * * *